(12) United States Patent
Eichler et al.

(10) Patent No.: US 9,998,028 B2
(45) Date of Patent: Jun. 12, 2018

(54) LOW INDUCTIVITY CIRCUIT ARRANGEMENT OF AN INVERTER

(71) Applicants: Markus Eichler, Waldshut-Tiengen (DE); Marc Stolte, Zürich (CH); Ralph Niederer, Basel (CH)

(72) Inventors: Markus Eichler, Waldshut-Tiengen (DE); Marc Stolte, Zürich (CH); Ralph Niederer, Basel (CH)

(73) Assignee: Woodward Kempen GmbH, Kempen (DE)

( * ) Notice: Subject to any disclaimer, the term of this patent is extended or adjusted under 35 U.S.C. 154(b) by 0 days. days.

(21) Appl. No.: 15/425,847

(22) Filed: Feb. 6, 2017

(65) Prior Publication Data

US 2017/0149355 A1    May 25, 2017

Related U.S. Application Data

(63) Continuation of application No. PCT/EP2015/068396, filed on Aug. 10, 2015.

(30) Foreign Application Priority Data

Aug. 11, 2014  (DE) .......... 10 2014 111 421

(51) Int. Cl.
*H02M 7/487* (2007.01)
*H02M 7/00* (2006.01)
(Continued)

(52) U.S. Cl.
CPC .......... *H02M 7/487* (2013.01); *H02M 7/003* (2013.01); *H02M 1/14* (2013.01); *H02M 7/10* (2013.01); *H02M 7/217* (2013.01)

(58) Field of Classification Search
CPC ........ H02M 7/003; H02M 7/487; H02M 1/14; H02M 7/10; H02M 7/217; H02M 7/219;
(Continued)

(56) References Cited

U.S. PATENT DOCUMENTS

| 5,172,310 A | 12/1992 | Deam et al. |
| 8,422,230 B2 * | 4/2013 | Aiba ............... H02M 1/00 165/104.33 |

(Continued)

FOREIGN PATENT DOCUMENTS

| DE | 42 32 763 A1 | 3/1994 |
| DE | 198 33 491 A1 | 2/2000 |
| WO | WO 2013/069415 A1 | 5/2013 |

OTHER PUBLICATIONS

Wikipedia, Ballast (electrical engineering), Internet Article, English translation of webpage last accessed Mar. 14, 2017, German version of webpage last accessed Mar. 3, 2015, 9 pages https://de.wikipedia.org/wiki/Drossel_(Elektrotechnik).

*Primary Examiner* — Fred E Finch, III
*Assistant Examiner* — Demetries A Gibson
(74) *Attorney, Agent, or Firm* — Reinhart Boerner Van Deuren P.C.

(57) ABSTRACT

The invention relates to a circuit arrangement of a phase leg of a three-point converter. A circuit arrangement of a three-point converter is provided that is optimised with regard to the suppression of parasitic inductance, and at the same time has a compact simple construction, so that the converter can be incorporated in a electrical enclosure in a space-saving and installation friendly manner.

14 Claims, 15 Drawing Sheets

(51) Int. Cl.
*H02M 1/14* (2006.01)
*H02M 7/217* (2006.01)
*H02M 7/10* (2006.01)

(58) Field of Classification Search
CPC .......... H02M 7/06; H02M 7/155; H02M 7/46; H02M 7/483; H02M 7/515; H02M 7/537
See application file for complete search history.

(56) References Cited

U.S. PATENT DOCUMENTS

| | | | | |
|---|---|---|---|---|
| 2002/0034087 A1* | 3/2002 | Suzuki | .................. | H02M 7/003 363/144 |
| 2002/0034089 A1* | 3/2002 | Mori | .................. | H02M 5/4585 363/147 |
| 2010/0265664 A1* | 10/2010 | Okumura | ................ | H01L 25/18 361/716 |
| 2012/0163057 A1* | 6/2012 | Permuy | ................. | H02M 7/487 363/131 |
| 2013/0343108 A1 | 12/2013 | Shepard | | |
| 2014/0022738 A1* | 1/2014 | Hiller | .................... | H05K 5/0021 361/730 |
| 2014/0192578 A1* | 7/2014 | Koyano | ................. | H02M 5/293 363/149 |
| 2014/0264519 A1* | 9/2014 | Totani | ................... | H02M 7/003 257/299 |
| 2015/0340962 A1* | 11/2015 | Zhang | .................. | H02M 7/003 363/84 |
| 2015/0340963 A1* | 11/2015 | Huang | ................. | H02M 7/219 363/126 |
| 2016/0141973 A1* | 5/2016 | Abdalla | ................ | H02M 5/458 363/36 |
| 2016/0211741 A1* | 7/2016 | Ishino | ................... | H02M 7/003 |
| 2016/0374229 A1* | 12/2016 | Nishikimi | ............. | H02M 7/003 |
| 2017/0033593 A1* | 2/2017 | Kamizuma | ............... | H02J 9/06 |

* cited by examiner

LOW INDUCTIVITY CIRCUIT ARRANGEMENT OF AN INVERTER

CROSS-REFERENCE TO RELATED PATENT APPLICATIONS

This patent application is a continuation of PCT/EP2015/068396, filed Aug. 10, 2015, which claims priority to German Application No. 10 2014 111 421.3, filed Aug. 11, 2014, the entire teachings and disclosure of which are incorporated herein by reference thereto.

FIELD OF THE INVENTION

The invention relates to a circuit arrangement of a phase leg of a three-point converter comprising:
three DC connections for positive, negative and zero potential and an AC connection,
a first pair of series-connected semiconductor switching elements, which connect the positive DC-potential to the AC connection,
a second pair of series-connected semiconductor switching elements, which connect the negative DC-potential to the AC connection,
two circuit means that connect the DC zero potential via in each case one of the series-connected semiconductor switching elements of each pair to the AC connection,
a cooling body with a first cooling surface, wherein the semiconductor switching elements and the circuit means are installed in a common plane on the cooling surface of the cooling body,
connecting bars that extend perpendicularly to the first cooling surface of the cooling body and provide an electrical connection of the semiconductor switching elements to the circuit means, to the DC connections and to the AC connection of the circuit arrangement, wherein the connecting bars have means for establishing electrical contact with the semiconductor switching elements.

BACKGROUND OF THE INVENTION

Three-point converters can switch three different DC voltage potentials (+DC, zero, −DC) to an AC connection and thus convert a DC voltage into an AC voltage, or an AC voltage into a DC voltage. The components and connections that are required in order to provide an AC connection between the positive and negative DC connection by switching technology are termed phase leg of a converter. The DC-potentials are generally formed by two capacitors connected in series, so that the connection of both capacitors forms the DC zero potential and the respective other connections of the capacitors form the positive or respectively the negative potential. In order that the respective DC potential can be switched to the output, at least four semiconductor switching elements (active electronic switches, e.g. IGBTs) are necessary, which are switched in series between the positive and the negative potential. Additionally, two further circuit means, for example active or passive electronic switches, switch the DC zero potential to the output. In the prior art a distinction is made between NPC (neutral point clamped) and ANPC (advanced neutral point clamped) topology, wherein passive switches such as diodes (MPC) or active switches such as transistors (ANPC) are used for the connection of the DC zero potential. Three-point converters are frequently used to provide voltages of more than 500 V, in particular also to provide medium voltages of 1 kV to 52 kV. Areas of application include energy supply, such as for example wind turbine generators, but also traction drives and further areas in which large electrical powers have to be converted. The use of three-point converters has two basic advantages compared to 2-point converters, which can provide only two DC-potentials. On the one hand higher voltages can be switched since in each case two semiconductor switching elements are switched in series and thus their reverse biases are added up. On the other hand filters that are required in order to damp the harmonics generated by the switching of the switching elements can be made smaller. On account of the switching procedures of the switching elements interfering voltage peaks can occur, which can be reduced by using connections with minimal inductance in the circuit arrangement. For this purpose flat connecting bars or plates are often used, which are placed as close as mechanically possible next to one another and in which the currents flow in opposite directions. Nevertheless since voltage peaks can still occur, so-called snubbers are often provided directly at the connections of the semiconductor switching elements in order to damp these peaks.

DE 42 32 763 A1 discloses a circuit arrangement of a three-point converter, in which a minimum of parasitic inductances in the commutation circuits is to be achieved by equilibrating the leads to the semiconductor switching elements in the individual phases. In the phase legs all semiconductor switching elements are installed along a straight line on a cooling body and establish electrical contact with one another and the intermediate circuit capacitances via three-layer connecting bars. On account of the three-layer current conduction the interspacing of current-conducting layers is not minimal and can vary, so that there is scope for improvement as regards the suppression of parasitic inductances. Furthermore a more compact construction of the converter appears possible, so that this can be optimised for the arrangement in an electrical enclosure.

BRIEF SUMMARY OF EMBODIMENTS OF THE INVENTION

An object of the present invention is therefore to provide, starting from the aforementioned prior art, a circuit arrangement of a three-point converter that is optimised with regard to the suppression of parasitic inductance, and at the same time has a compact, simple construction, so that the converter can be incorporated in a space-saving and installation-friendly manner in an electrical enclosure. A further object of the present invention is accordingly to provide a suitably constructed electrical enclosure as well as an electricity generation device comprising a corresponding electrical enclosure.

According to a first teaching of the present invention the aforementioned object is achieved by a generic circuit arrangement of a phase leg of a three-point converter, in which the individual connecting bars have at least one region in which at least two connecting bars are arranged parallel and directly adjacent to one another and during the switching over between two switching states the current flow directions are identical, so that the change in flow generated by the current change in one connecting bar can be at least partially compensated by the current change in the other connecting bar, and in each case exactly two connecting bars, which serve for the establishment of electrical contact with an individual semiconductor switching element, are arranged parallel to one another in the region of the connections of the respective semiconductor switching element.

The configuration of the connecting bars of the device according to the invention allows in the stationary state, i.e. during the duty-cycle of a switching state, a reduction of the parasitic inductances by an opposite current direction in the region of the connections of the semiconductor switching elements. In this way the opposite magnetic fields of the current-carrying connecting bars arranged directly adjacent to one another are superposed, and the resulting magnetic field is minimised or almost completely eliminated. In addition, apart from the opposite current direction, by having a same current direction in at least one region of at least two connecting bars when switching between two switching states an almost constant magnetic flux is generated around both connecting bars in the region due to the decrease of the current flow in the region of one connecting bar and to the simultaneous, preferably quantitatively identical increase in the current flow in the other parallel connecting bar in this region.

Since the parallel connecting bars are arranged directly adjacent to one another, in view of the externally generated magnetic flux they therefore behave as one conductor with a constant current. The generated magnetic flux does not change if for example the current flow in the parallel, directly adjacently arranged regions of the bars, remains constant as a whole. Also, a partial compensation of the flux change in one connecting bar region enables a reduction of the flow change in the respective connecting bar region when switching over between two switching states and thus contributes to reducing parasitic inductances due to the parallel aligned other connecting bar region, for example if the parallel currents do not have the same quantitative value. Since large changes in current within the circuit arrangement occur in particular when switching over between the switching states, the reduction of the flow change has a significant impact in the parallel connecting bar regions having the same current flow direction. The risk of the generation of voltage peaks on account of parasitic inductances is thus reduced further. As already mentioned, the device according to the invention reduces particularly in transient states the parasitic inductances due to regions in which the current flows in the opposite direction and also due to regions in which the increase and decrease of the current flow generates a constant magnetic flux or a reduction of the change in flux. As a result a very good suppression of parasitic inductances during the overall operation is thereby achieved, i.e. during the switched-on duration of a switching state and also during the switching over.

According to a first embodiment of the circuit arrangement according to the invention the individual semiconductor switching elements of the first and second pair of the series-connected semiconductor switching elements are arranged in a row respectively along a first extension direction and both pairs are arranged parallel to one another along a second extension direction, rotated by 90° with respect to the first direction, on the cooling body, and the circuit means for connecting the DC zero potential to the AC connection are arranged between both pairs of series-arranged semiconductor switching elements, wherein individual connecting bars are provided for the electrical connection of the semiconductor switching elements to the positive and to the negative DC-potential, which bars have at least one right angle in the plane of the cooling surface of the cooling body, and individual connecting bars are provided for the electrical connection of the series-connected semiconductor switching elements, which have at least two right angles in the plane of the cooling surface of the cooling body, and in each case exactly two connecting bars, which serve for the establishment of electrical contact with an individual semiconductor switching element, are arranged parallel to one another at least in the region of the connections of the respective semiconductor switching elements.

Owing to the arrangement of the series-connected semiconductor switching elements in respectively two rows with interposed circuit means, formed for example as mid-point diodes, the space on the corresponding cooling body can be better utilised. In addition, the electrical connections between the individual elements of the switching arrangement can then be particularly short. This also results in a reduction of parasitic inductances. Furthermore, the positioning of the semiconductor switching elements can be used in order to arrange in the region of the connections of the respective semiconductor switching elements in each case two connecting bars parallel and preferably directly adjacent to one another. If the semiconductor switching elements are controlled for example by a pulse width modulation, the largest transient changes in current occur in the region of the connections of the semiconductor switching elements, so that by means of an optimised arrangement of the connecting bars in this region, namely a parallel arrangement of exactly two connecting bars, a particularly good suppression of parasitic inductances is achieved. The individual connecting bars for the electrical connection of the semiconductor switching elements to the positive and to the negative DC-potential as well as to the next series-connected semiconductor switching element furthermore allow the connecting bars to be held as simply as possible and in this respect can be made cost-efficient. The at least one right angle in the plane of the cooling surface of the cooling body of the connecting bars for the electrical connection of the semiconductor switching elements to the positive and negative DC-potential allows a parallel arrangement over a maximum area of these connecting bars with the connecting bars for establishing electrical contact with the series-connected semiconductor switching elements on the one hand as well as the connecting bars for connecting the DC zero potential to the circuit means on the other hand. The at least two right angles in the plane of the cooling surface of the cooling body of the connecting bars for the electrical connection of the series-connected semiconductor switching elements allow the use of approximately U-shaped connecting bars, which ensures a parallel arrangement over a maximum area of these connecting bars with the connecting bars for the connection of the positive and negative DC-potential to the semiconductor switching elements and the connecting bar of the semiconductor elements to the AC connections. As a result, with simply constructed connecting bars in the stationary switching state a minimisation of the parasitic inductances due to opposite current flow is achieved at least in the connecting regions of the semiconductor switching elements. In the transient state, i.e. during the switching over between two switching states, apart from the aforementioned opposite current flow in specific connection regions of the semiconductor switching elements there is in addition a minimisation of parasitic inductances due to a current flow in the same flow direction in other regions of the connecting bars, for example between the positive DC-potential and a semiconductor switching element as well as the DC zero potential and a circuit means, due to a reduction of the generated change in magnetic flux during the switching over to another switching state. IGBT modules for example are used as semiconductor switching elements. It is however also possible to use other components as semiconductor switching elements, for example thyristors or GTOs.

According to a further embodiment of the circuit arrangement the connecting bars have at least one angled bracket for establishing electrical contact with the semiconductor switching elements that is at least partially in a plane that is aligned parallel to the plane of the cooling surface of the cooling body. In this way an establishment of electrical contact with the semiconductor switching elements is achieved in a simple manner without having to give up the parallel arrangement of the current bars also in the connecting regions of the semiconductor switching elements. At the same time the connecting bars can easily be electrically connected via screw connections to the semiconductor switching elements.

If according to a further embodiment the two circuit means are arranged in a common housing or in two individual housings, the mid-point diodes or transistors provided as circuit means can be installed more quickly if they are arranged in a single housing. In addition, the then freed space on the cooling body can be used for example for a drive circuit for controlling the semiconductor switching elements and the circuit means. Larger nominal power is made possible if circuit means in separate housings are used. At this the information provided by the semiconductor manufacturers should be taken into account.

Furthermore, according to a further embodiment the connecting bar that connects the AC connection to the connections of the semiconductor switching elements can be formed as a straight bar or as a hat-shaped bar. A straight bar can for example be used if the housing of a circuit means is installed between the two semiconductor switching elements, which are placed remote from the DC connections. With the hat-shaped bar for connecting the semiconductor switching elements to the AC connection the position of the circuit means can be shifted in the direction of the DC connections, so that the leads to the circuit means are shorter. In both cases it is ensured that the connecting bar for establishing electrical contact to the DC zero potential to the circuit means and the connecting bar that connects the AC connection to the connections for the semiconductor switching elements run partially parallel and directly next to one another.

The establishment of electrical contact with the connecting means of the circuit arrangement is accomplished in a particularly simple manner if, according to a further embodiment, the connecting bars that electrically connect the series-connected semiconductor switching elements to one another have in addition in each case at least one angled bracket in a plane that is aligned parallel to the plane of the cooling surface of the cooling body, for establishing electrical contact with a circuit means.

If a connecting bar that comprises at least two angled brackets for establishing electrical contact with the circuit means is provided for connecting the DC zero potential to the two circuit means, then it is ensured that the DC zero connecting bar can be arranged parallel and directly adjacent to the positive and negative DC connecting bar. Accordingly when switching over between the individual switching states it can always be ensured that the increase and the decrease of the current flow in the DC connecting bars superpose to an almost constant magnetic flux.

Preferably, the circuit arrangement is designed so that, with the exception of the angled brackets for connecting the circuit means and the semiconductor switching elements, the connections of the DC-potentials, and of the AC connection, always two connecting bars are arranged parallel and directly adjacent to one another. Directly adjacent to one another means that the connecting bars are separated from one another simply by a thin insulating layer. In this way the parasitic inductances can be minimised as far as possible.

Preferably, the connecting bars are according to a further embodiment insulating coated, so that a minimum spacing can be chosen between the parallel-running connecting bars. Such a coating can for example be produced by a fluidised-bed coating method with powder provided for the purpose. Furthermore, instead of or in addition to an insulating coating an external, additional insulating agent can obviously also be used.

A particularly compact arrangement of the circuit arrangement is achieved according to a further embodiment of the circuit arrangement if the DC connections extend in a plane perpendicular to the plane of the cooling surface and parallel to the arrangement of the semiconductor switching elements. In this way the DC connections can be connected without any problem to intermediate circuit capacitors formed as capacitor banks. A capacitor bank is understood to mean a plurality of capacitors arranged spatially close to one another, whose DC connections are connected in a simple manner to one another via suitable means, for example metal plates or bars. The DC connections of the circuit arrangement can then for example be connected directly to the metal plates that join the connections of the capacitors to one another. This arrangement in addition makes extremely good use of the space in an electrical enclosure.

The aforementioned object of the invention is also achieved by a circuit module comprising at least two circuit arrangements according to the invention, in which both circuit arrangements have a common cooling body, the cooling body comprises a second cooling surface lying opposite a first cooling surface and on each of these two cooling surfaces respectively at least one circuit arrangement of a phase leg of a three-point converter with semiconductor switching elements, circuit means and connecting bars is provided, wherein preferably the DC connections of both phase legs run in the same plane. By means of this arrangement of two phase legs on a cooling body a particularly space-saving arrangement of a plurality of circuit arrangements can be achieved. For example, two phase legs can thus be connected by means of their DC connections directly to a capacitor bank without the need for an additional cooling body and the associated additional connections for the cooling medium. These two phase legs can preferably be provided as input and output of a 4-quadrant converter for the same phase, e.g. L1, L2 or L3. In addition, via the circuit module a particularly space-saving arrangement of the switching arrangements separated according to phases in an electrical enclosure can be achieved.

Furthermore an electrical enclosure comprising at least one circuit arrangement according to the invention or at least one circuit module according to the invention can achieve the object stated above, since the electrical enclosure can be constructed in a particularly compact manner by means of the circuit arrangement or circuit modules according to the invention.

If according to a further embodiment a total of three circuit modules consisting of a total of six circuit arrangements for three input phase legs and three output phase legs are provided in the electrical enclosure, then an electrical enclosure of for example a power generation device, in particular a wind turbine, can be made available, which despite the compact construction can feed a high output to a power supply network for example. The input and output phases can be spatially separated in a simple manner by the use of the circuit arrangements, for example in such a way that the connections of the input phases are arranged pointing downwards and the connections of the output phases are arranged pointing upwards. Downwards and upwards refer here to the generally conventional installation layout of an electrical enclosure. Of course, other orientations of the connections, in different directions as well as in the same direction, are conceivable.

Preferably, according to a further teaching of the invention the object mentioned above is achieved by a device for generating electrical energy, in particular a wind turbine, comprising at least one electrical enclosure according to the invention. The rated outputs of modern wind turbines, whether they be turbines with doubly fed asynchronous machines and a partial converter or also turbines with synchronous machines and a full converter, are constantly increasing. The electrical enclosure with the circuit arrangements enables a compact and extremely efficient construction, with at the same time high power density and simple maintenance.

BRIEF DESCRIPTION OF THE SEVERAL VIEWS OF THE DRAWING

The invention will be described in more detail hereinafter with the aid of exemplary embodiments in conjunction with the drawings. The drawings show.

DETAILED DESCRIPTION OF EMBODIMENTS OF THE INVENTION

Figure 1:
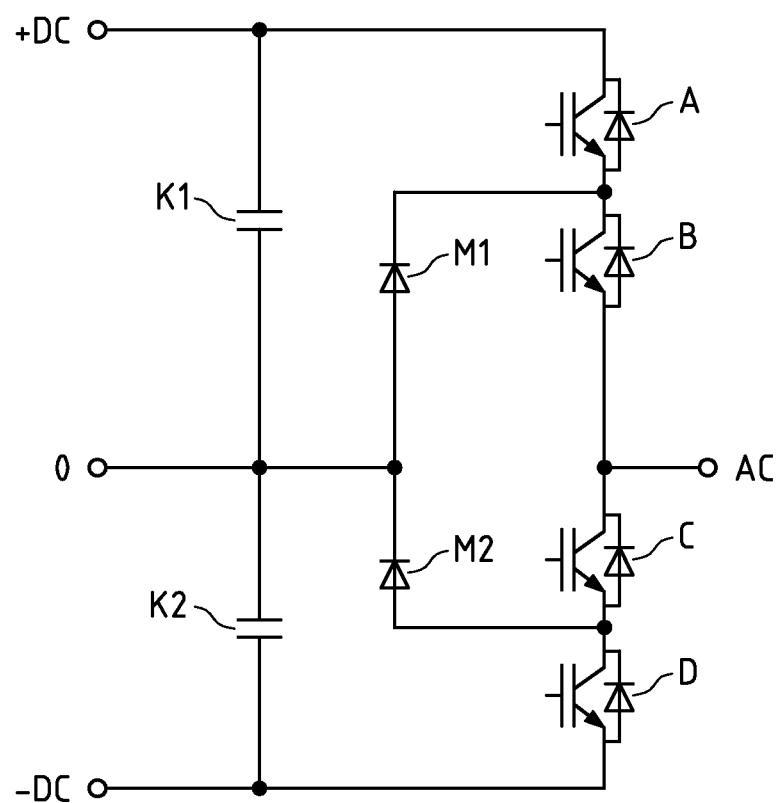
FIG. 1 shows a circuit diagram of an exemplary embodiment of a phase leg of a three-point converter.

First of all, in FIG. 1 the electrical circuit diagram of a phase leg of a three-point converter in NPC topology together with intermediate circuit capacitors is illustrated. Two intermediate circuit capacitors K1 and K2 connected in series can first of all be recognised between the positive and negative DC-potential. The positive and negative DC-potential is connected via in each case two series-connected semiconductor switching elements A, B and also D, C to an AC connection. In addition, two mid-point diodes M1 and M2 are provided, which connect the DC zero potential applied between the intermediate circuit capacitors K1 and K2 via a semiconductor switching element B, C to the AC connection. By means of the circuit illustrated in FIG. 1 it is possible by switching the semiconductor switching elements A, B, C, D to apply respectively either the potential +DC, 0-DC or -DC to the AC connection.

Table 1 shows the possible switching states of the phase leg together with the associated voltage at the AC connection, where 1 denotes that the semiconductor switching element is closed and 0 denotes that the semiconductor switching element is open.

TABLE 1

| Switching state | A | B | C | D | Voltage at the AC connection |
|---|---|---|---|---|---|
| 1 | 1 | 1 | 0 | 0 | +DC |
| 2 | 0 | 1 | 1 | 0 | 0 |
| 3 | 0 | 0 | 1 | 1 | -DC |

There are in principle these three possible switching states in order to switch a DC voltage potential, also the zero potential, to the AC connection. On switching over from one state to the other sharp transient changes in current occur in the branches to be switched-off and in newly switched-on branches in the circuit arrangement.

As a rule IGBT modules, as illustrated here, are used as semiconductor switching elements. On account of the switching procedures in the phase leg illustrated in FIG. 1 voltage peaks may be formed due to existing parasitic inductances, so that on the one hand the current output possibility of a phase leg is limited and on the other hand so-called "snubber circuits" have to be provided in order to protect the semiconductor switching elements A, B, C, D. The circuit arrangement of a three-point converter in NPC topology known from the prior art and illustrated in FIG. 1 must therefore be constructed by connections between the individual semiconductor switching elements and intermediate circuit capacitors that ensure a minimal parasitic inductance.

Figure 2:
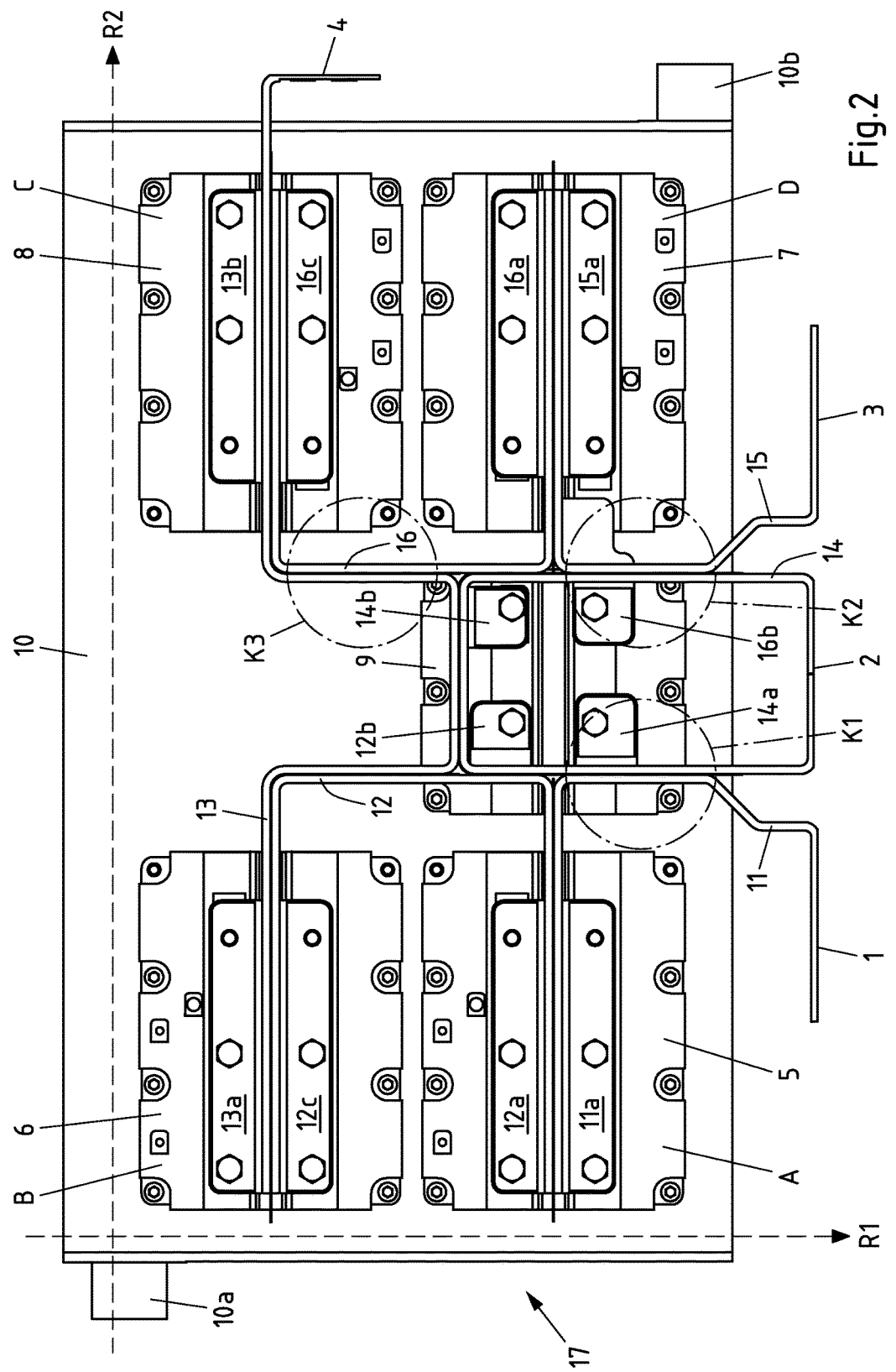
FIG. 2 shows an exemplary embodiment of a circuit arrangement according to the invention in a side view.

FIG. 2 shows a first exemplary embodiment of a circuit arrangement 17 according to the invention, which first of all has three connections 1, 2, 3 for positive, zero and negative DC-potential as well as an AC connection 4. The connection point 2 between the intermediate circuit capacitors is at zero potential in this exemplary embodiment. The two other connection points 1, 3 are respectively at positive and negative potential. In FIG. 2 a first pair of series-connected semiconductor switching elements A, B is furthermore represented, which are arranged in module housings 5, 6. The first pair of series-connected semiconductor switching elements A, B connects the positive DC potential of the connection point 1 via connecting bars 11, 12, 13 to the AC connection 4. Furthermore, a second pair of series-connected semiconductor switching elements D, C is provided, which connects the negative DC potential of the connection point 3 to the AC connection. The two semiconductor switching elements D, C are likewise arranged in housings 7, 8.

Solely the circuit means, which are formed as mid-point diodes M1, M2, are arranged in a common housing 9. The semiconductor switching elements A, B, C, D are mounted jointly with the circuit means M1 and M2 on a cooling surface of a cooling body 10. The cooling body 10 includes a coolant inlet 10a and a coolant outlet 10b. The heat emitted by the circuit arrangement can be at least partially dissipated through the cooling body by coolant flow. The cooling body can be cooled by a liquid coolant as well as by air. A total of six individual connecting bars 11, 12, 13, 14, 15, 16 are provided, which connect the semiconductor switching elements A, B, C, D as well as the circuit means M1 and M2 to the connection points for the DC-potentials 1, 2, 3 as well as to the AC connection 4. The connecting bars extend in this case perpendicularly to the plane of the cooling surface of the cooling body 10 (outwards from the plane of the drawing) and comprise as means for the establishment of electrical contact with the circuit means M1, M2 or the semiconductor switching elements A, B, C, D, angled brackets 11a, 12a, 12b, 12c, 13a, 13b, 14a, 14b, 15a, 16a, 16b, 16c, with which the connecting bars establish electrical contact either with the semiconductor switching elements A, B, C, D or the circuit means M1 and M2. Screw connections for example are used for the connection.

The individual connecting bars (11, 12, 13, 14, 15, 16) have regions (K1, K2, K3) arranged parallel and directly adjacent to one another, which can be enlarged as much as possible since during the switching over between two switching states these regions have the same current flow direction and can thus generate a constant magnetic flux. This is described in detail hereinafter. In each case exactly two connecting bars (11, 12, 13, 15, 16), which serve for the establishment of electrical contact with an individual semiconductor element (A, B, C, D), are arranged parallel and directly adjacent to one another in the region of the connections of the respective semiconductor switching element, so that the resultant magnetic field is minimised owing to an oppositely directed current.

As can be seen from FIG. 2, the individual semiconductor switching elements of the first pair A, B and of the second pair C, D are respectively arranged in a row along a first extension direction R1 and the two pairs are arranged on the cooling surface of the cooling body 10 parallel to one another along a second elongation direction R2 rotated by 90° compared to the first extension direction. The circuit means M1 and M2 are provided between the pairs of semiconductor switching elements A, B and C, D. The individual connecting bars 11 and 15 have respectively at least one right angle in the plane of the cooling surface of the cooling body 10, while the connecting bars 12 and 16 have at least two right angles in the plane of the cooling surface of the cooling body 10, and are thus formed substantially U-shaped. In addition it can be seen that also the connecting bar 13, which connects the semiconductor switching elements B and C to the AC connection 4, as well as the connecting bar 14 via which the DC zero potential is connected to the circuit means M1 and M2, have right angles in the plane of the cooling surface. Owing to the arrangement of the right angles it is possible, as can be seen in FIG. 2, always to arrange two connecting bars in parallel and directly adjacent to one another without the flat configuration of the connecting bars having to be altered. In addition FIG. 2 shows that the current paths between the individual elements of the circuit arrangement can be kept very short on account of the position on the cooling surface of the cooling body 10. In particular, the current paths are constructed symmetrically in both branches of the circuit arrangement. In the present exemplary embodiment in each case exactly two connecting bars are arranged in parallel and directly adjacent to one another at least in the region of the connections of the semiconductor switching elements A, B, C, D, so that here parasitic inductances generated by transient changes in current flow can be minimised. Owing to the directly adjacent and parallel arrangement of the connecting bars there is a particularly small spacing between the current-conducting bars, so that the suppression of parasitic inductance is maximised here.

Furthermore, it can be seen from the exemplary embodiment that the connecting bar 13 for connecting the semiconductor switching elements B, C to the AC connection 4 is formed as a hat-shaped bar, and in addition the AC connection 4 is angled by 90°. In this case hat-shaped refers to the connecting bar 13 being bent at right angles altogether four times, of which respectively two angles are counter clockwise and two angles are clockwise and are located in the same plane at the start and end of the bar. The connecting bar 13 thus has at every point a directly adjacent, current-conducting connecting bar, so that the influence of parasitic inductance is suppressed maximally. The U-shaped leads of the DC zero potential from the connection point 2 to the circuit means M1 and M2 ensures an as large as possible two-dimensional parallel arrangement of the DC zero bar 14 with the positive and negative DC potential bars 11 and 15. In particular current flows through the regions K1 and K2 during the switching over from one switching state to another in such a way that for example the current flow from the DC zero potential increases, whereas the current flow from the positive or negative DC potential to the semiconductor switching elements A, D decreases. This also applies to the region K3, which is formed by the hat-shaped connecting bar 13 and the connecting bar 16. In this way it is ensured that the transient changes in current occurring during the switching over between the switching states are accompanied by no or only reduced changes in flow and therefore undesired inductances. This is described in detail later on the basis of FIGS. 7-11.

In the exemplary embodiment illustrated in FIG. 2 it is ensured that, with the exception of the angled brackets for the connection of the circuit means and the semiconductor switching elements, and the connections of the DC potentials and the AC connection, two connecting bars 11, 12, 13, 14, 15, 16 are always arranged parallel and directly adjacent to one another. In particular it can be ensured by means of insulating coated connecting bars 11, 12, 13, 14, 15, 16 that the spacing of the current-conducting connecting bars 11, 12, 13, 14, 15, 16 from one another is minimized and therefore the suppression of parasitic inductances is maximized. As already explained, the connecting bars that connect the series-connected semiconductor switching elements A, B and C, D to one another, have in addition in each case an angled bracket in a plane aligned parallel to the plane of the cooling surface of the cooling body, for the establishment of electrical contact with a circuit means M1, M2.

Figure 3:
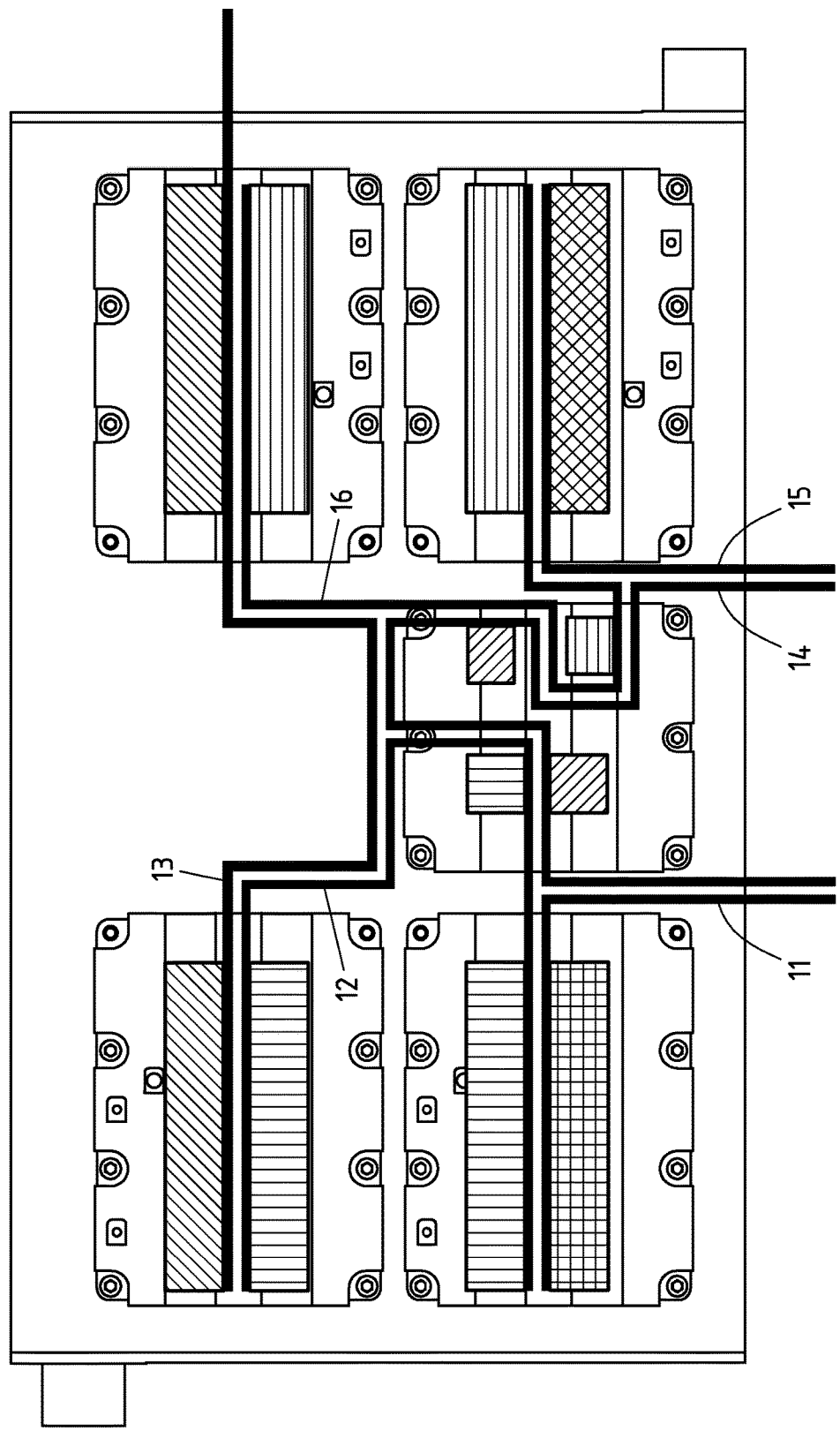
FIG. 3 shows another exemplary embodiment of a circuit arrangement according to the invention in a side view.

In FIG. 3 a further exemplary embodiment of a circuit arrangement according to the invention is illustrated in a schematic side view, wherein the connecting bars 11 and 15 likewise have at least one right angle and the connecting bars 12 and 16 at least two right angles in the plane of the cooling surface of the cooling body, though for the connection of the circuit means M1, M2 further bends or right angles are required in order to allow a substantially parallel arrangement of in each case two connecting bars. The construction of the connecting bars in the exemplary embodiment in FIG. 3 therefore ensures, with a compact construction of the circuit arrangement of the phase leg, also a very good suppression of parasitic inductance.

Figure 4:
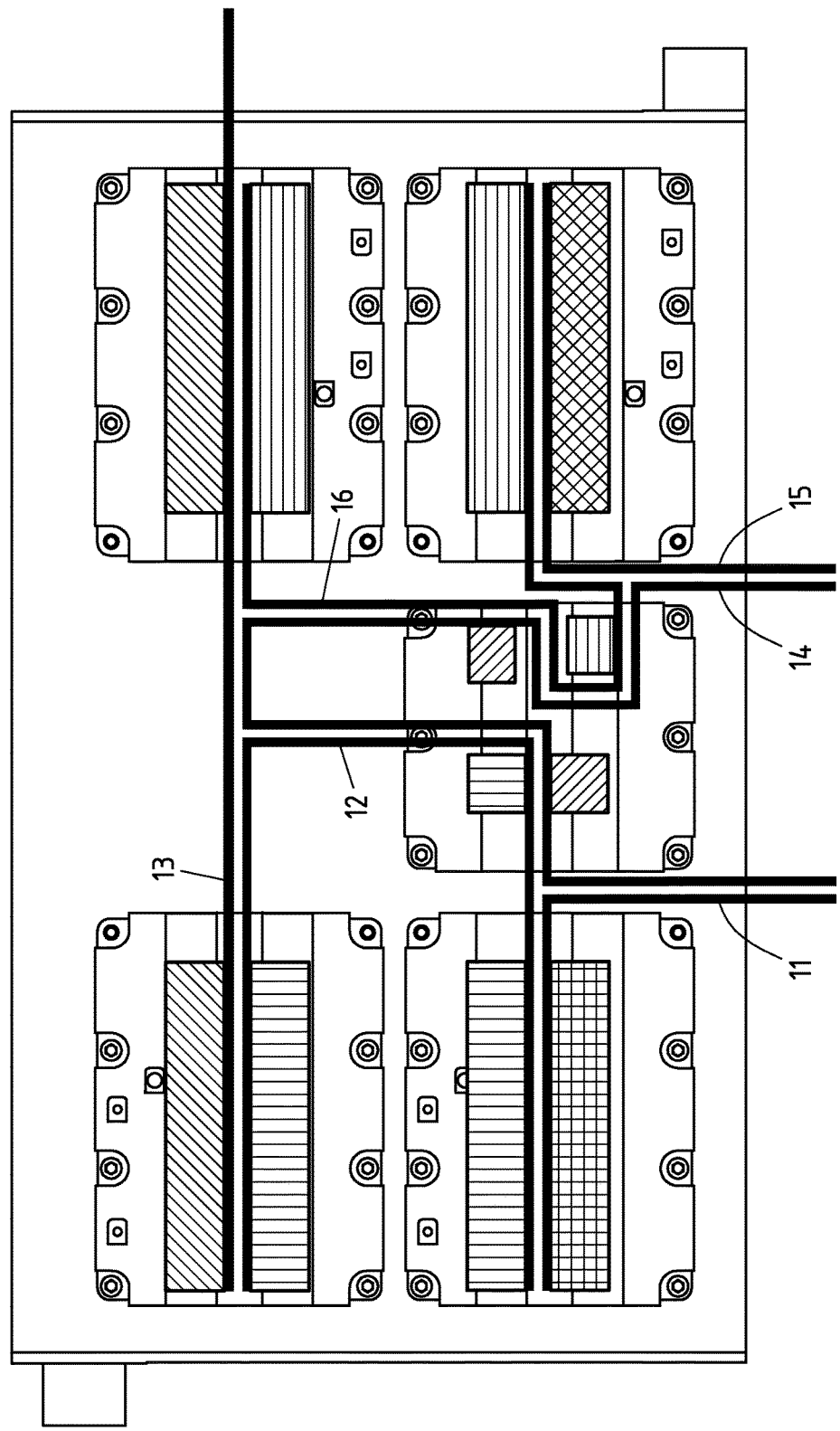
FIG. 4 shows still another exemplary embodiment of a circuit arrangement according to the invention in a side view.

This is also the case with the exemplary embodiment of FIG. 4, which has a connecting bar 13 formed as a straight bar for connecting the semiconductor switching elements B, C to the AC connection 4. In FIG. 4 it can be seen that in order to ensure a substantially parallel arrangement of in each case two connecting bars, the shaping of the connecting bars, in particular here the connecting bar 14, proves to be more complex than the exemplary embodiment of FIG. 2. However, also FIG. 4 ensures a maximum compensation of parasitic inductances together with a compact structure on a cooling surface of a cooling body.

Figure 5:
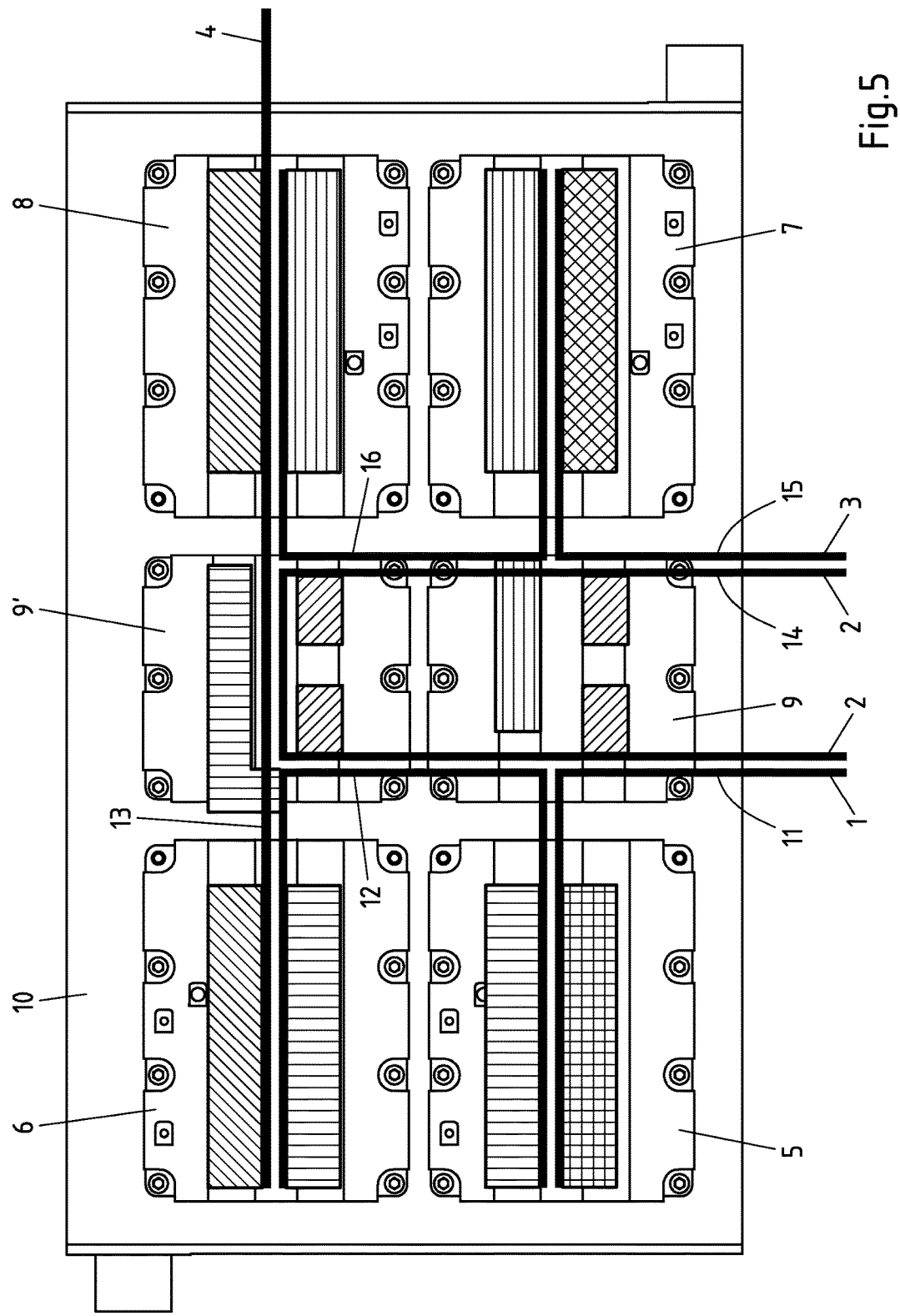
FIG. 5 shows a further exemplary embodiment of a circuit arrangement according to the invention in a side view.

A further particularly simple construction is shown in FIG. 5, in which the connecting means M1 and M2 are subdivided into two housings 9 and 9'. In this way higher loads can be switched with a circuit arrangement than by integrating the circuit means in a single housing. In contrast to the exemplary embodiment of FIG. 2, here the DC zero bar 14 is configured so that it connects the two circuit means M1 and M2 arranged in separate housings to the DC zero potential. In this case the connecting bar 13 is implemented as a simple straight bar. The other bars 11, 12, 15 and 16 remain unchanged. Thereby, a simple possibility is created for adapting the circuit arrangement when using circuit means in separate housings.

Figure 6:
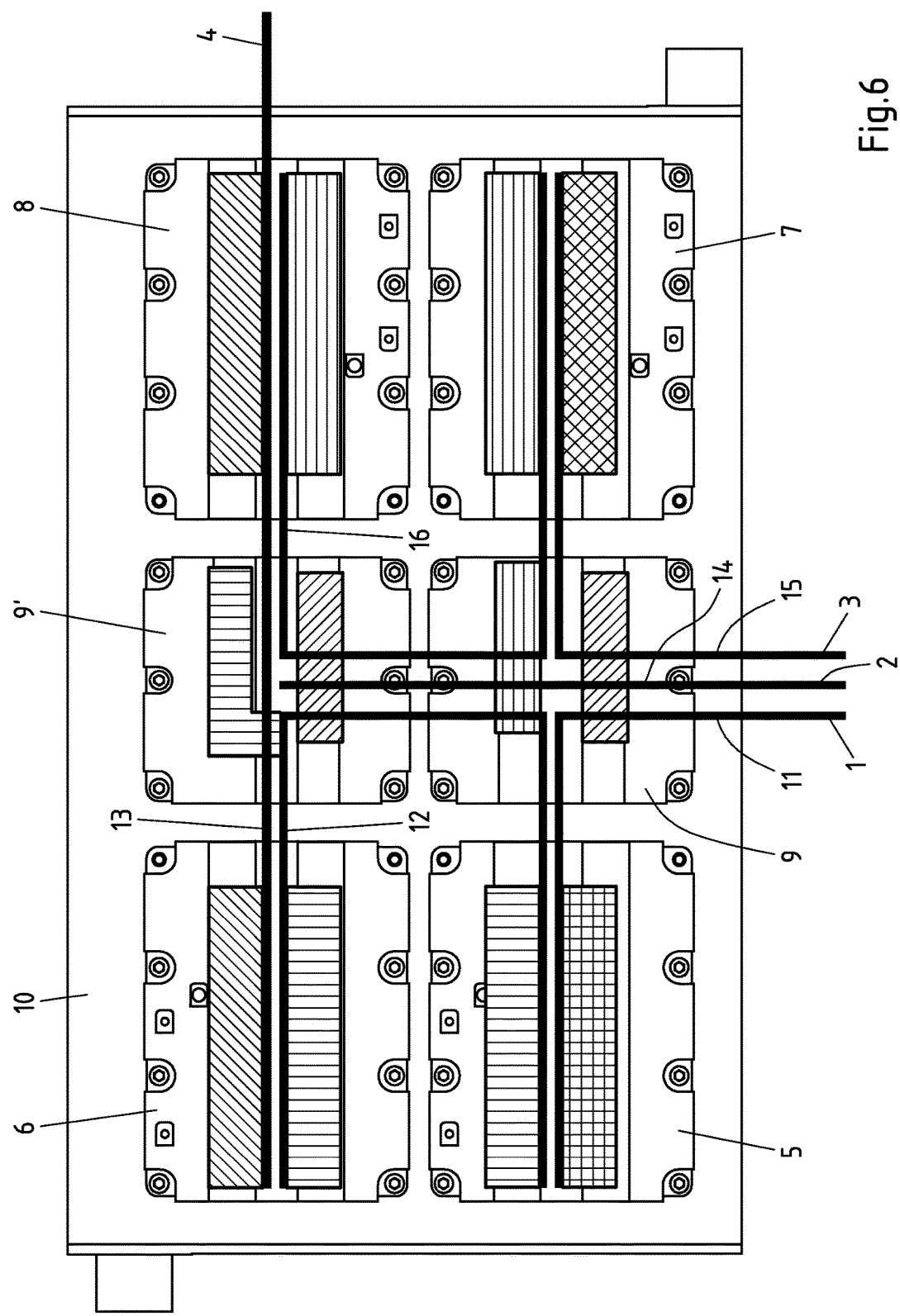
FIG. 6 shows yet another exemplary embodiment of a circuit arrangement according to the invention in a side view.

An alternative implementation is shown in FIG. 6. The DC zero connecting bar 14 is in this case a simple straight connecting bar. The circuit arrangement illustrated in FIG. 6 comprises particularly simple configured connecting bars, though in this case three bars are partially arranged in parallel. Nevertheless this variant too exhibits an improved suppression of parasitic inductance.

FIG. 7 to FIG. 11 show the three switching states mentioned in Table 1 as well as the transient events during switching between them for the exemplary embodiment illustrated in FIG. 2. FIG. 7a) shows first of all the respective electrical circuit diagram of the circuit arrangement with through-connected semiconductor switching elements A, B corresponding to the switching state 1 shown in Table 1. The semiconductor switching elements C, D are rendered non-conductive, so that the current flow takes place only via the semiconductor switching elements A, B from the positive DC potential to the AC connection 4.

Figure 7A:
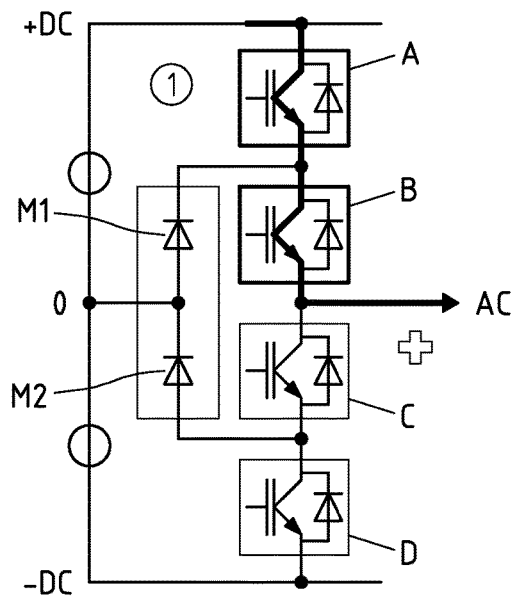
FIG. 7a), b) show in a schematic representation current flows of the first exemplary embodiment during a first switching state.
Figure 7B:
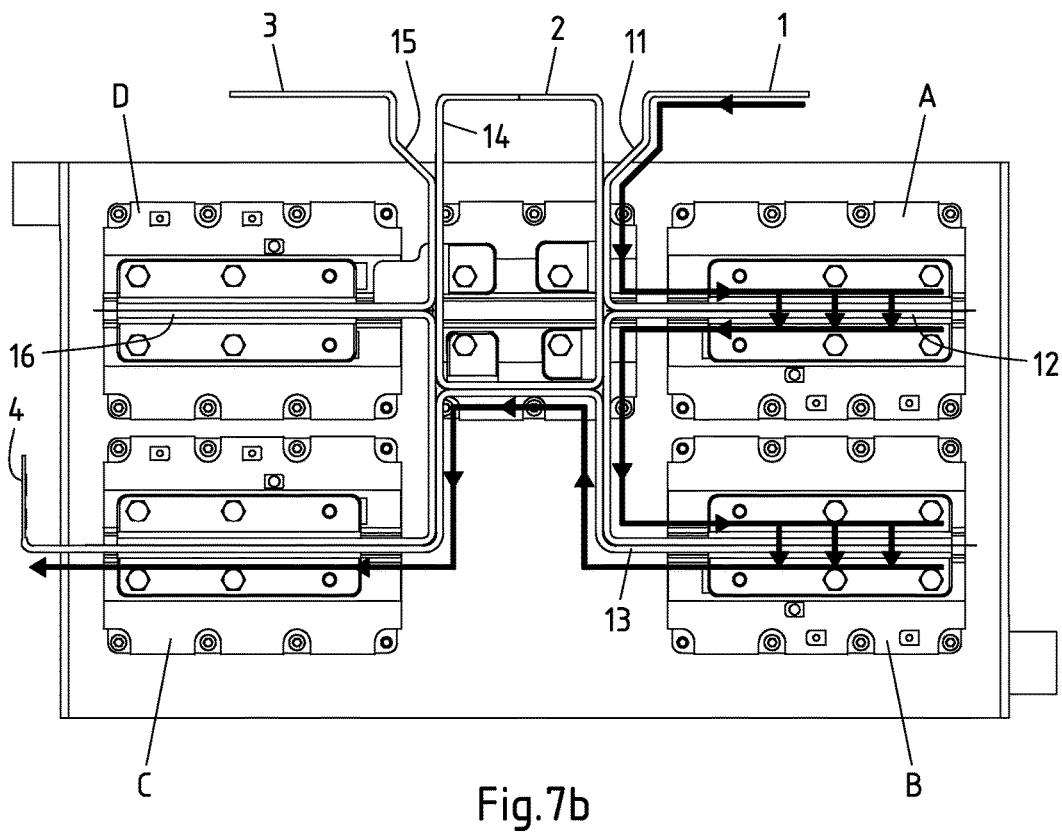
Figure 8A:
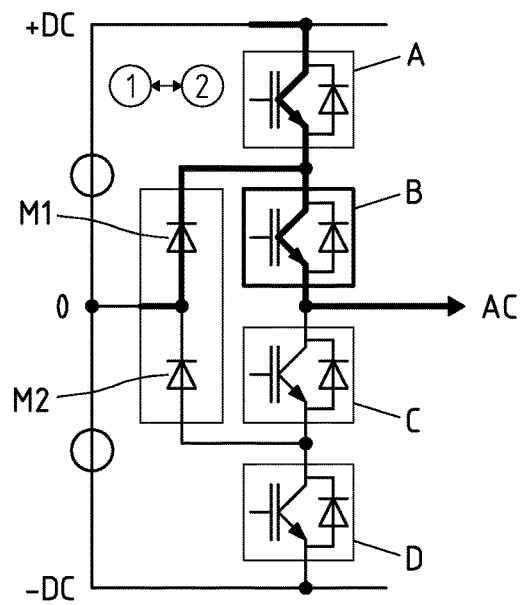
FIG. 8a), b) show in a schematic representation current flows of the first exemplary embodiment during a transition state.
Figure 8B:
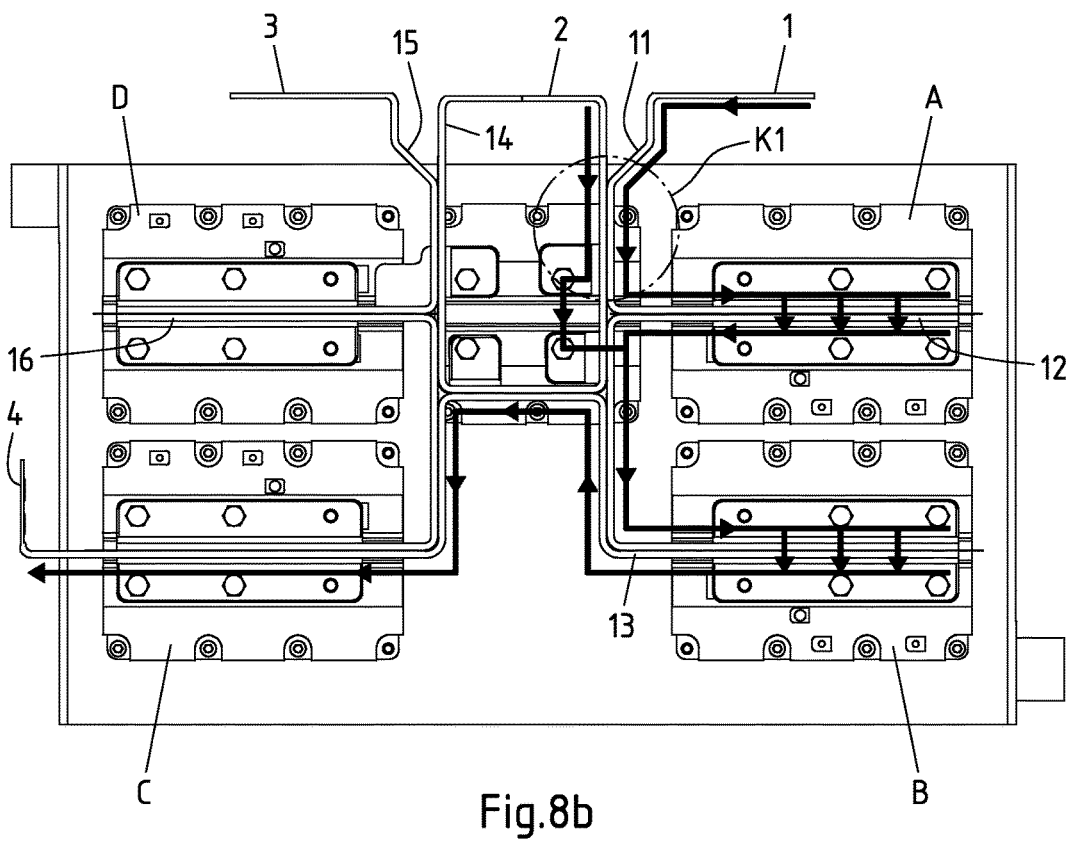

A transient state occurs when switching over from the switching state 1 to the switching state 2, which is illustrated in FIG. 8a) and b). In this transient state the current flow decreases in the branch to be switched off, whereas it increases in the branch to be switched on. These changes in the current flow lead potentially to undesired voltage peaks on account of parasitic inductances. The transient currents are marked in FIG. 8a). The current through the transistor A decreases starting from the switching state 1 in FIG. 7, and at the same time the current through the circuit means M1 increases. As can be seen in FIGS. 7b), 8b) and 9b), the current in the switching state 1 flows at first from the connection point 1 via the connecting bar 11 to the transistor A. This current path is switched off, and therefore the current then flows in the switching state 2 from the connection point 2 via the connecting bar 14 to the diode M1. Since the two connecting bars 11 and 14 are arranged parallel and directly adjacent to one another in the region K1 and the current flow in the two bars is in the same direction, the increase and decrease of the current flow in the directly adjacent regions K1 of the connecting bars are compensated, so that the change in flow in the region K1 is less. Since the current however also flows through the other leg of the approximately U-shaped connecting bar 14, the change in flow on account of the changing current flow in the connecting bar 11 is partially compensated and thereby reduced.

Figure 9A:
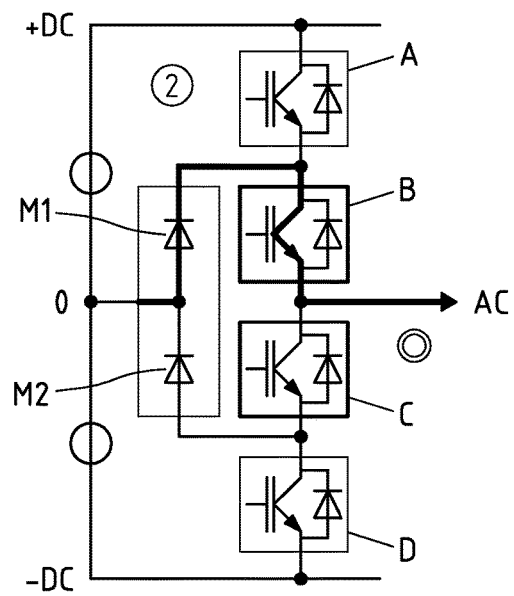
FIG. 9a), b) show in a schematic representation current flows of the first exemplary embodiment during a second switching state.
Figure 9B:
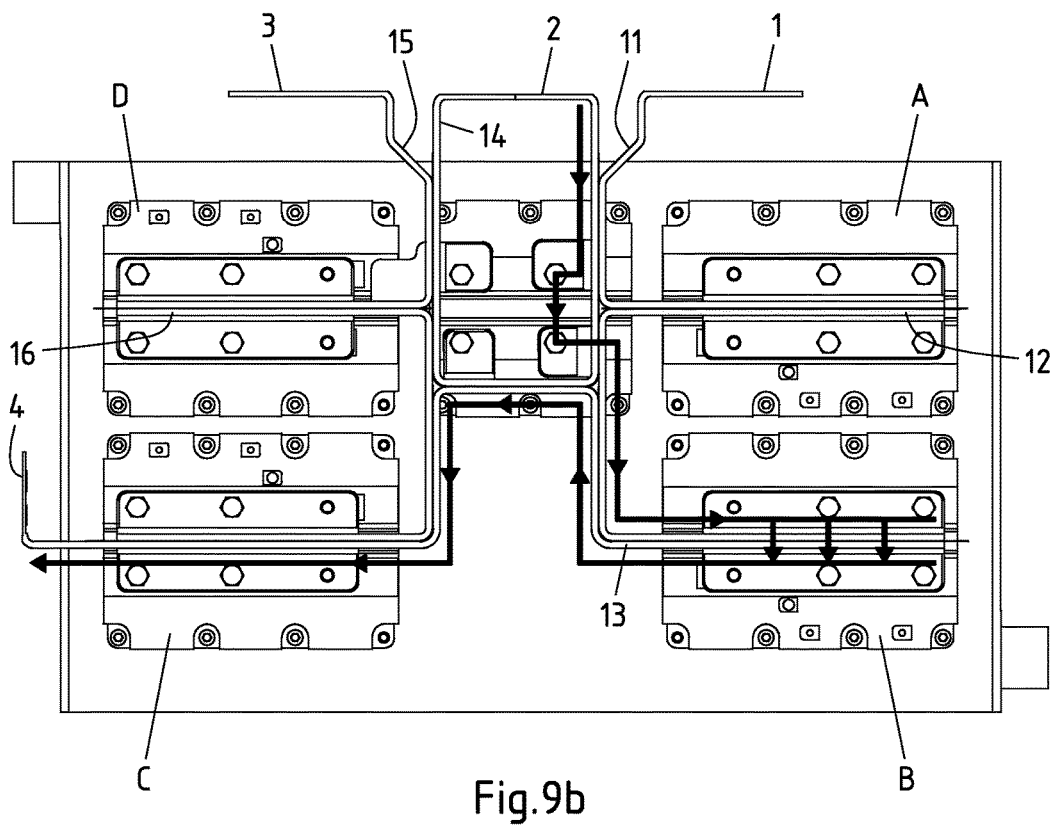

FIG. 9 now shows the switching state 2, in which the DC zero potential is electrically connected to the AC connection 4.

Figure 10A:
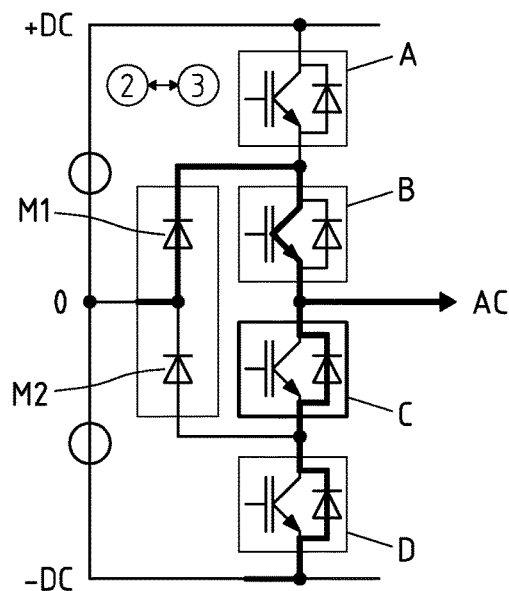
FIG. 10a), b) show in a schematic representation current flows of the first exemplary embodiment during another transition state.
Figure 10B:
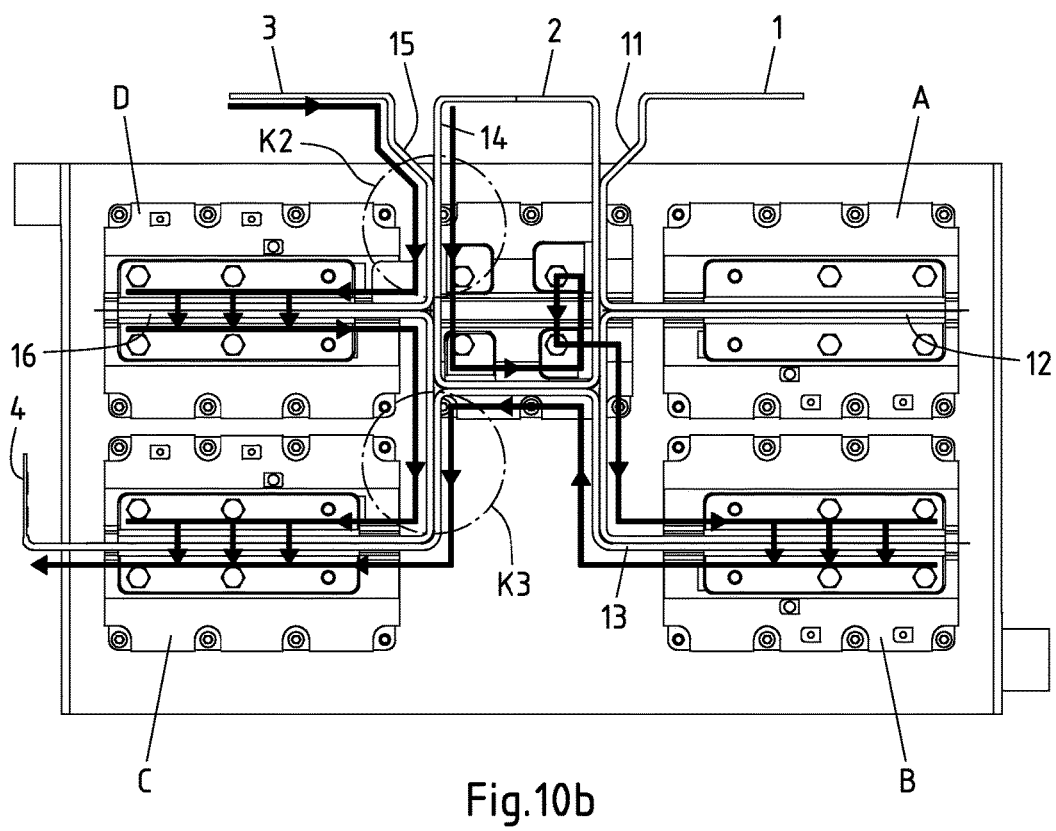

The switching over from the second to the third switching state is shown in FIG. 10. It can be seen how, in accordance with FIG. 10a), the current flow through the mid-point diode M1 to the AC connection 4 decreases and at the same time the current flow from the negative DC-potential through the semiconductor switching elements C and D increases. As can be seen in the current conduction in FIG. 10b), the connecting bars 14 and 15 run parallel and directly adjacent to one another in the region K2, and the increasing and decreasing current flow takes place in the same direction, so that here too the change in magnetic flux is reduced and thus the occurrence of voltage peaks can be reduced. In the region K3 the connecting bars 13 and 16 also run parallel to one another. Both connecting bars 13 and 16 have the same current directions during switching over, as shown in FIG. 10. The current flow in the region K3, in which the connecting bars 13 and 16 run parallel to one another, remains constant since here the increase and decrease of the current flow takes place in the same direction and is of the same absolute amount. As a result the magnetic flux surrounding the region K3 remains constant during the switching between the states. As the magnetic flux does not change, no voltage is induced and the occurrence of undesired voltage peaks is thus counteracted in this way.

Figure 11A:
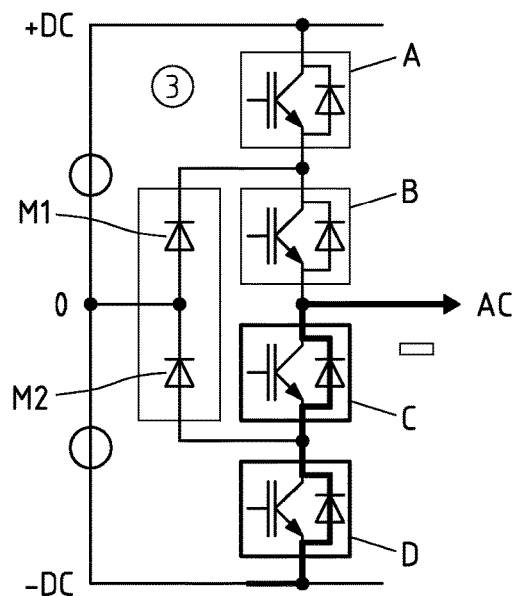
FIG. 11a), b) show in a schematic representation current flows of the first exemplary embodiment during a third switching state.
Figure 11B:
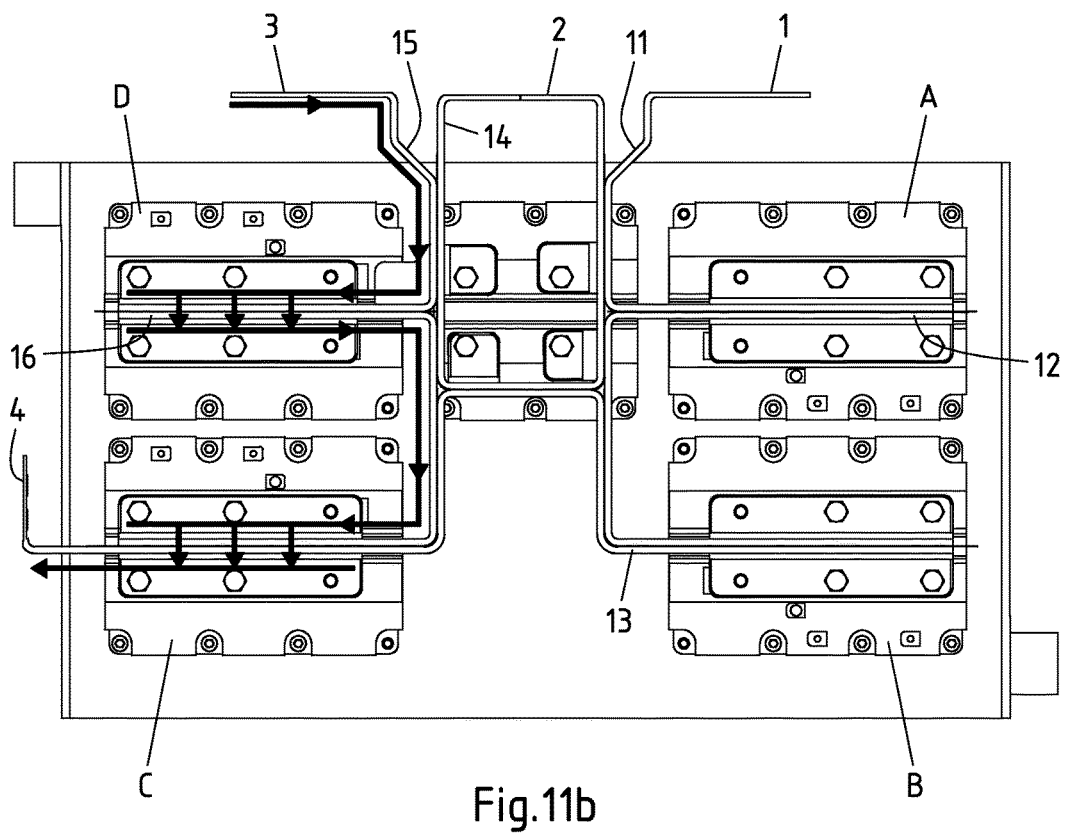

FIG. 11 shows finally the third switching state, in which the negative DC potential is connected to the AC connection 4.

Apart from the described avoidance of changes of magnetic flux in transient events between the individual switching states, a further advantage of the structure of the circuit arrangement according to the invention is that, due to the opposite current flow in two adjacent connecting bars, the magnetic field and therefore also the parasitic inductance is reduced. This effect applies principally in stationary processes, i.e. as long as a switching state lasts. FIGS. 7, 9 and 11 corresponding to the switching states 1, 2 and 3 illustrate this. Thus, for example, it can be seen in FIG. 7b) that the two bars 11 and 12, which lead to the transistor A, are supplied by the same current but in opposite directions. The same also applies in the case of the bars 12 and 13, which lead to the transistor B. FIGS. 9 and 11 illustrate this correspondingly for the switching states 2 and 3.

Figure 12:
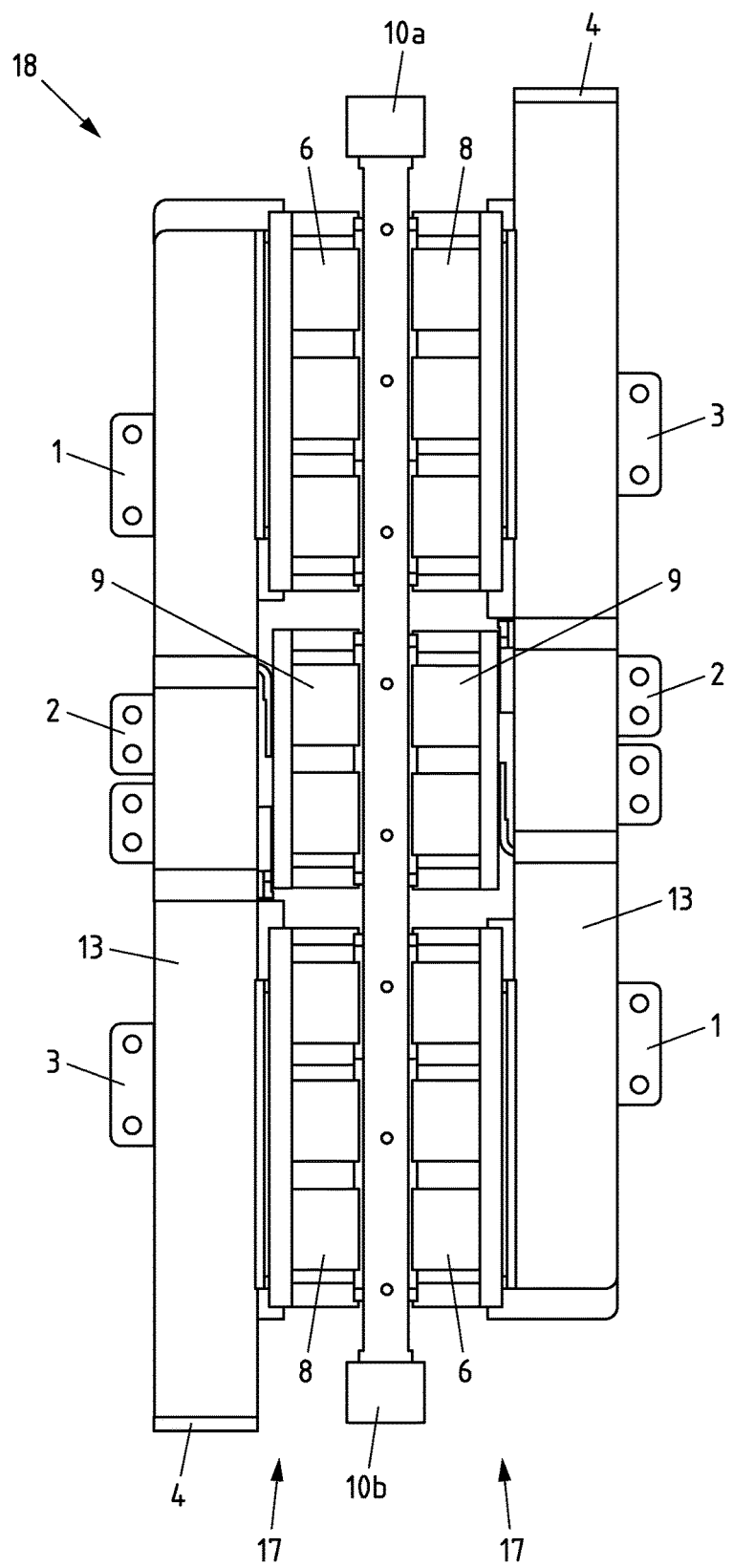
FIG. 12 shows a circuit module composed of two circuit arrangements.

FIG. 12 shows a circuit module 18, which is composed of two circuit arrangements 17 according to the invention as known from FIG. 2, which are installed on the opposite sides of a common cooling body 10. The transistors 6, 8, the diodes 9, the connecting bar 13, the DC connections 1, 2, 3, the AC connections 4 as well as the coolant connections 10a and 10b are shown. An input and output phase for a converter can thus be realised in a spatially compact and simple manner. It can readily be seen that the respective AC connections 4 point in opposite directions, whereby a particularly compact construction of a electrical enclosure is created. Obviously a construction in which the AC connections point in the same or arbitrary other directions is also conceivable.

Figure 13:
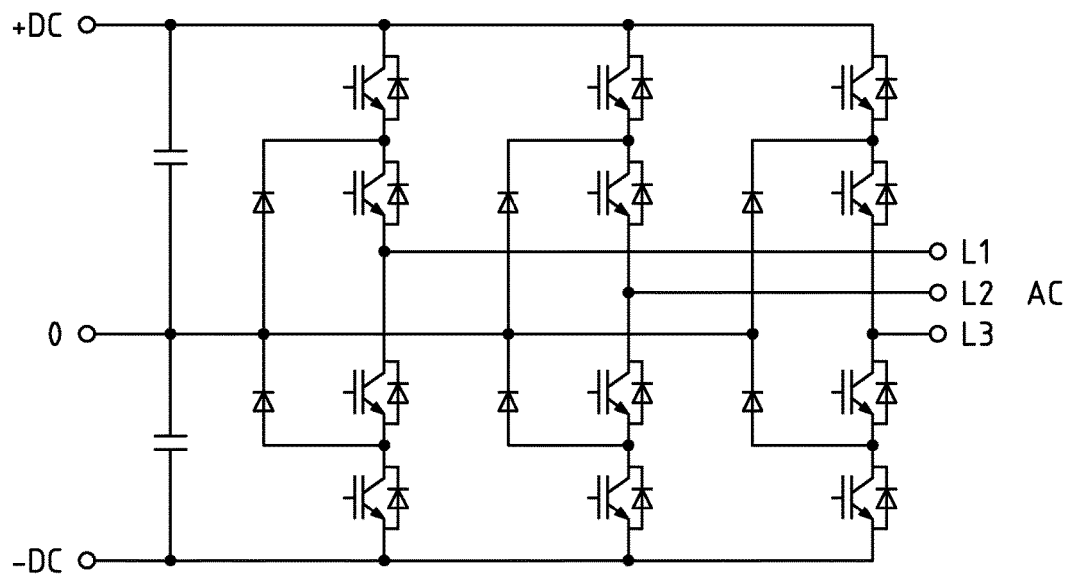
FIG. 13 and FIG. 14 are schematic diagrams of three-phase, known converters in NPC or ANPC topology.
Figure 14:
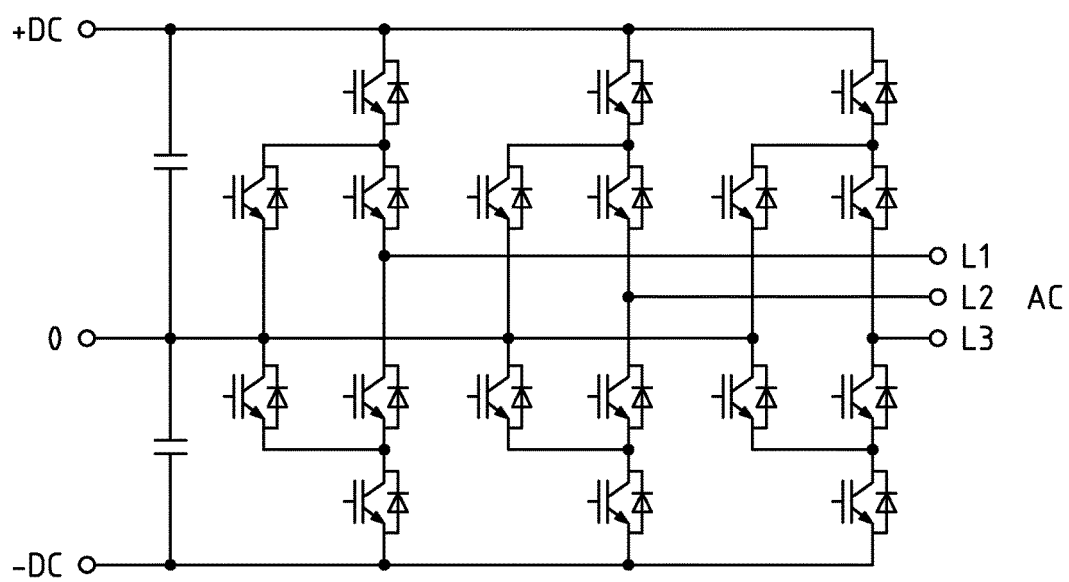

In FIG. 2 to FIG. 11 only one phase leg of a branch module was previously illustrated. Normally the three-point converters are designed however for three phases. The electrical circuit diagrams of such three-phase three-point converters known from the prior art are shown in FIG. 13 for the NPC topology and also in FIG. 14 for the ANPC topology, in which the mid-point diodes are replaced by further semiconductor switching elements, in this case transistors. In FIG. 15 a corresponding three-phase three-point converter is illustrated in an electrical enclosure, using the circuit arrangement according to the invention.

Figure 15A:
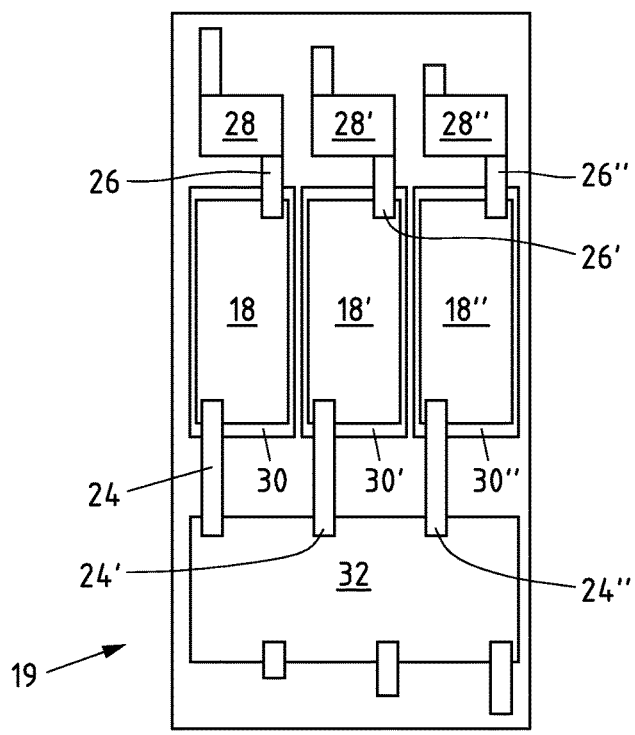
FIG. 15a), b) shows in a plan view as well as in a side view an exemplary embodiment of an electrical enclosure according to the invention.
Figure 15B:
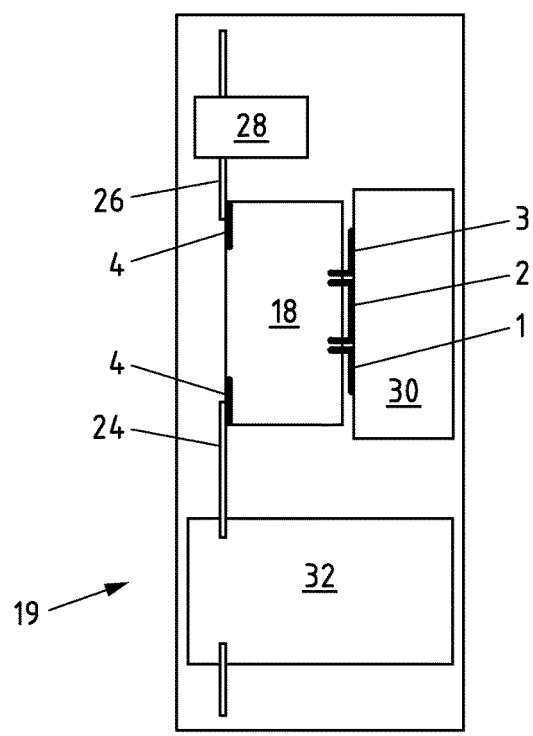

A schematic plan view as well as a schematic side view of an electrical enclosure 19 according to the invention, which comprises at least one circuit arrangement according to the invention, are shown in FIGS. 15a) and 15b). As indicated in FIG. 15a), in this electrical enclosure there are provided three circuit modules 18, 18', 18", which are composed of in each case two circuit arrangements 17 on a common cooling body 10. In this way a complete 4-quadrant converter for three phases can be constructed, that is three phase legs are provided as input for conversion from AC to DC and three phase legs are provided as output for conversion from DC to AC. FIG. 15b) shows how the circuit arrangements according to the invention are connected via the DC connections 1, 2, 3 to the intermediate circuit capacitors, here illustrated as capacitor banks 30, 30', 30". The capacitor banks 30, 30', 30" are electrically connected in parallel. The AC connections 4 of the circuit arrangements are in each case provided on the opposite side and are connected via electrical connecting bars 24 and 26 to a mains choke 32 and du/dt filters 28, 28', 28". Following this the connection to a power supply network or a generator, for example a wind turbine, then takes place. Due to the location of the AC connections 4 a spatial separation of the input and output phases can be obtained and along with this a particularly compact and space-saving electrical enclosure structure can be achieved, in which further components, such as the mains choke 32 or du/dt filter 28, can be accommodated with minimal interspacing and thus also minimal connection lengths in the switch-gear cabinet.

Figure 16:
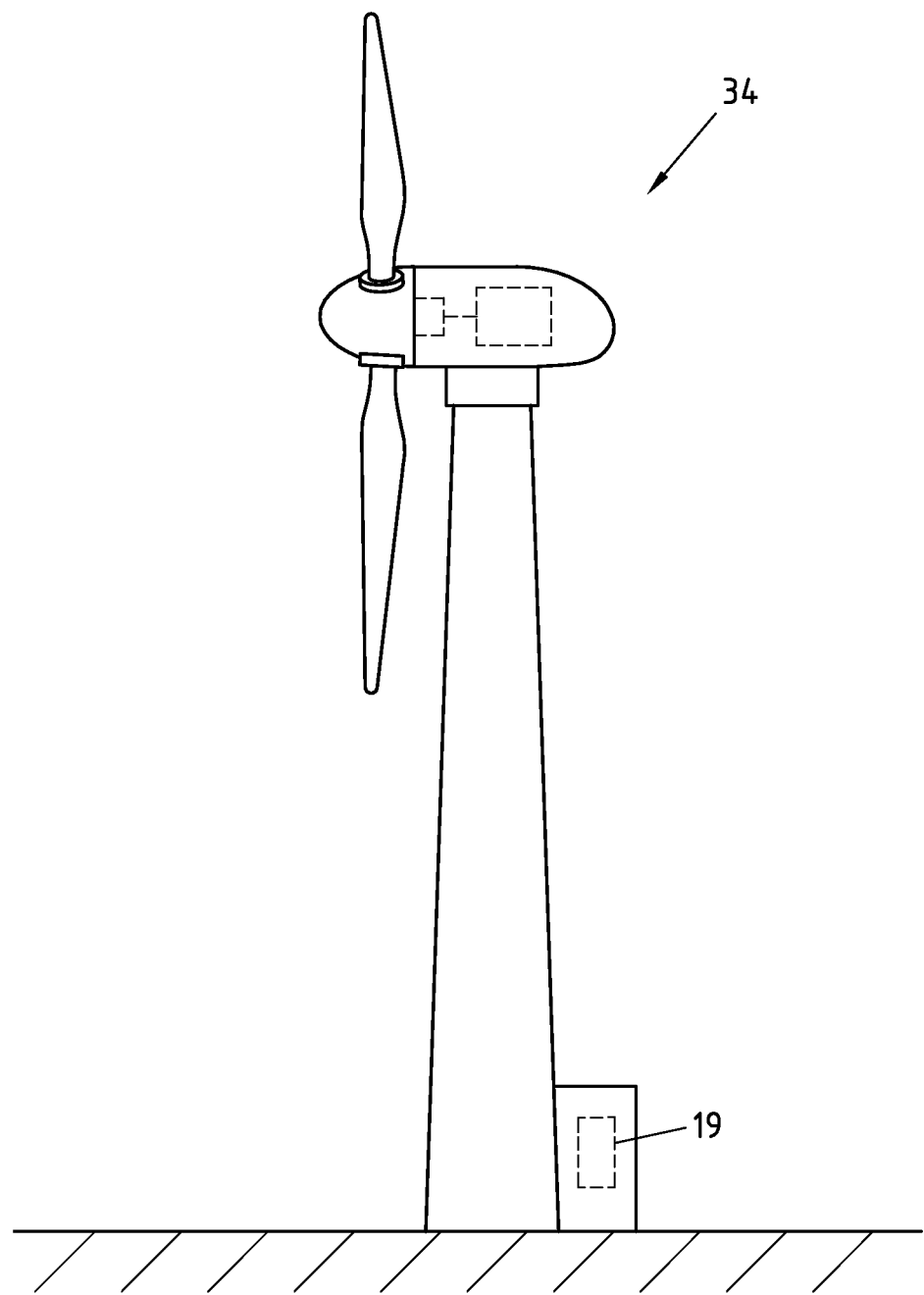
FIG. 16 shows an exemplary embodiment of a power generation device in the form of a side view of a wind turbine.

Preferably a corresponding electrical enclosure 19 is arranged in a wind turbine 34, as illustrated in FIG. 16, in order to convert the electrical energy of the generator in such a way that it can be fed for example into a power supply network. Further applications are possible in other devices for generating electrical energy, and therefore generators in particular with a fluctuating rotational speed, but also in the control of motors.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. Circuit arrangement of a phase leg of a three-point converter comprising:
   three DC connections for positive, negative and zero potential and an AC connection,
   a first pair of series-connected semiconductor switching elements, which connect the positive DC-potential to the AC connection,
   a second pair of series-connected semiconductor switching elements, which connect the negative DC-potential to the AC connection,
   two circuit means for connecting the DC zero potential via in each case one of the series-connected semiconductor switching elements of each pair to the AC connection,
   a cooling body with a first cooling surface, wherein the semiconductor switching elements and the circuit means are installed in a common plane on the first cooling surface of the cooling body,
   connecting bars that extend perpendicularly to the first cooling surface of the cooling body and provide an electrical connection of the semiconductor switching elements to the circuit means, the DC connections and the AC connection of the circuit arrangement, wherein the connecting bars have means for establishing electrical contact with the semiconductor switching elements, characterized in that
   the individual connecting bars have at least one region, in which at least two connecting bars are arranged parallel and directly adjacent to one another and during the switching over between two switching states the current flow directions are identical, so that the change in flow generated by the change in current in one connecting bar can be at least partially compensated by the change in current in the other connecting bar, and in each case exactly two connecting bars, which serve for the establishment of electrical contact with an individual semiconductor switching element, are arranged parallel and directly adjacent to one another in the region of the connections of the respective semiconductor switching elements.

2. Circuit arrangement according to claim 1, characterized in that the individual semiconductor switching elements of the first and second pair of the series-connected semiconductor switching elements are respectively arranged in a row along a first extension direction and the two pairs are arranged on the cooling body parallel to one another along a second extension direction rotated by 90° relative to the first direction, wherein the circuit means for the connection of the DC zero potential to the AC connection are arranged between the two pairs of series-connected semiconductor switching elements, wherein individual connecting bars are provided for the electrical connection of the semiconductor switching elements to the positive and to the negative DC potential, which have at least one right angle in the plane of the cooling surface of the cooling body, and individual connecting bars are provided for the electrical connection of the series-connected semiconductor switching elements, which have at least two right angles in the plane of the cooling surface of the cooling body.

3. Circuit arrangement according to claim 1, characterized in that the connecting bars have at least one angled bracket at least partially in a plane that is aligned parallel to the plane of the cooling surface of the cooling body, for the establishment of electrical contact with the semiconductor switching elements.

4. Circuit arrangement according to claim 1, characterized in that the two circuit means are arranged in a common housing or in two individual housing.

5. Circuit arrangement according to claim 1, characterized in that the connecting bar, which connects the AC connection to the connections of the semiconductor switching elements, is formed as a straight bar or as a hat-shaped bar.

6. Circuit arrangement according to claim 1, characterized in that the connecting bars, which electrically connect to one another the series-connected semiconductor switching elements, additionally comprise in each case at least one angled bracket in a plane that is aligned parallel to the plane of the cooling surface of the cooling body, for the establishment of electrical contact with one of the circuit means.

7. Circuit arrangement according to claim 1, characterized in that for the connection of the DC zero potential to the two circuit means a connecting bar is provided, which comprises at least one, preferably two, angled bracket or brackets in a plane that is aligned parallel to the plane of the cooling surface of the cooling body, for the establishment of electrical contact with the circuit means.

8. Circuit arrangement according to claim 1, characterized in that with the exception of the angled brackets for the connection of the circuit means and the semiconductor switching elements, the connections of the DC-potentials and the AC connection, two connecting bars are always arranged parallel and directly adjacent to one another.

9. Circuit arrangement according to claim 1, characterized in that the connecting bars are coated in an insulating manner or insulating means are arranged between the connecting bars.

10. Circuit arrangement according to claim 1, characterized in that the DC connections extend in a plane perpendicular to the plane of the cooling surface and parallel to the arrangement of the semiconductor switching elements, which are connected respectively to the positive and the negative DC-potential.

11. Circuit module with at least two circuit arrangements according to claim 1, characterized in that at least two circuit arrangements have a common cooling body, the cooling body has a second cooling surface opposite a first cooling surface, and on each of these two cooling surfaces there is provided at least one circuit arrangement of a phase leg of a three-point converter with semiconductor switching elements, circuit means and connecting bars, wherein preferably the DC connections of both phase legs extend in the same plane.

12. Electrical enclosure comprising at least one circuit module according to claim 11.

13. Electrical enclosure according to claim 12, characterized in that a total of three circuit modules are provided comprising a total of six circuit arrangements for three input phase legs and three output phase legs.

14. Device for generating electrical energy, in particular a wind turbine, comprising at least one electrical enclosure according to claim 12.

\* \* \* \* \*